(12) United States Patent
Saul et al.

(10) Patent No.: US 9,933,891 B2
(45) Date of Patent: Apr. 3, 2018

(54) USER INPUT COMPRISING AN EVENT AND DETECTED MOTION

(71) Applicant: Microsoft Technology Licensing, LLC, Redmond, WA (US)

(72) Inventors: Greg Saul, Cambridge (GB); Nicolas Villar, Cambridge (GB); Daniel Cletheroe, Cambridge (GB); Haiyan Zhang, Cambridge (GB); Christian Holz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/231,174

(22) Filed: Aug. 8, 2016

(65) Prior Publication Data
US 2017/0123561 A1 May 4, 2017

Related U.S. Application Data

(63) Continuation-in-part of application No. 14/931,049, filed on Nov. 3, 2015.

(51) Int. Cl.
*G06F 3/041* (2006.01)
*G06F 3/0354* (2013.01)
(Continued)

(52) U.S. Cl.
CPC .......... *G06F 3/0416* (2013.01); *G06F 3/0354* (2013.01); *G06F 3/044* (2013.01); *G06F 3/046* (2013.01); *G06F 3/04883* (2013.01); *H01Q 1/2258* (2013.01); *H01Q 1/52* (2013.01); *H04B 5/00* (2013.01); *G06F 2203/04104* (2013.01); *G06F 2203/04106* (2013.01)

(58) Field of Classification Search
CPC ...... G06F 3/0416; G06F 3/044; G06F 3/0354; G06F 2203/04104; G06F 2203/04106; G06F 3/04883; G06F 3/046; H01Q 1/2258; H01Q 1/52; H04B 5/00
See application file for complete search history.

(56) References Cited

U.S. PATENT DOCUMENTS 2,170,373 A * 8/1939 Kind .................. A63F 7/066
                273/129 R
2007/0062852 A1 * 3/2007 Zachut ............... A63F 3/00643
                209/683
(Continued)

FOREIGN PATENT DOCUMENTS

| EP | 2172834 A2 | 4/2010 |
| EP | 2535797 A2 | 12/2012 |
| WO | 2009142383 A1 | 11/2009 |

OTHER PUBLICATIONS

"International Search Report and Written Opinion Issued in PCT Application No. PCT/US2016/059805", dated May 9, 2017, 21 Pages.

*Primary Examiner* — Patrick Edouard
*Assistant Examiner* — Joseph Fox

(57) ABSTRACT

A sensing surface device comprises a sensing module coupled to a sensing mat. The sensing module is configured to detect a first object at a first position on the sensing mat, detect an event associated with the first object and detect a movement at a second position on the sensing mat. The sensing module is further configured to generate an input to trigger an action in software based on both the detected event and the detected movement.

19 Claims, 9 Drawing Sheets

(51) Int. Cl.
*G06F 3/044* (2006.01)
*H01Q 1/22* (2006.01)
*H01Q 1/52* (2006.01)
*G06F 3/046* (2006.01)
*H04B 5/00* (2006.01)
*G06F 3/0488* (2013.01)

(56) References Cited

U.S. PATENT DOCUMENTS

| | | |
|---|---|---|
| 2010/0053111 A1 | 3/2010 | Karlsson |
| 2010/0267421 A1* | 10/2010 | Rofougaran ............ G06F 3/044 455/566 |
| 2013/0181937 A1* | 7/2013 | Chen ....................... G06F 3/044 345/174 |
| 2013/0207938 A1 | 8/2013 | Ryshtun et al. |
| 2014/0092054 A1 | 4/2014 | Ng |
| 2014/0104188 A1 | 4/2014 | Bakken et al. |
| 2015/0062045 A1* | 3/2015 | White ....................... G06F 3/03 345/173 |
| 2015/0169122 A1 | 6/2015 | Kulik et al. |

\* cited by examiner

USER INPUT COMPRISING AN EVENT AND DETECTED MOTION

CROSS-REFERENCE TO RELATED APPLICATION

This non-provisional utility application is a continuation-in-part of U.S. application Ser. No. 14/931,049 entitled "Multi-modal Sensing Surface" and filed on Nov. 3, 2015, which is incorporated herein in its entirety by reference.

BACKGROUND

There are many different technologies which can be used to produce a touch-sensitive surface including capacitive or resistive sensing and optical techniques. Capacitive multi-touch surfaces can detect the positions of one or more fingers on the surface, but cannot uniquely identify objects placed on the surface. Optical multi-touch tables, which use a camera/projector system or sensor-in-pixel technology, have the ability to identify objects equipped with a visual marker as well as sense multi-touch user input. Some technologies can only detect objects when they are actually in physical contact with the surface, whilst other technologies can detect objects which are in close proximity to the surface but are not in physical contact.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A sensing surface device comprises a sensing module coupled to a sensing mat. The sensing module is configured to detect a first object at a first position on the sensing mat, detect an event associated with the first object and detect a movement at a second position on the sensing mat. The sensing module is further configured to generate an input to trigger an action in software based on both the detected event and the detected movement.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
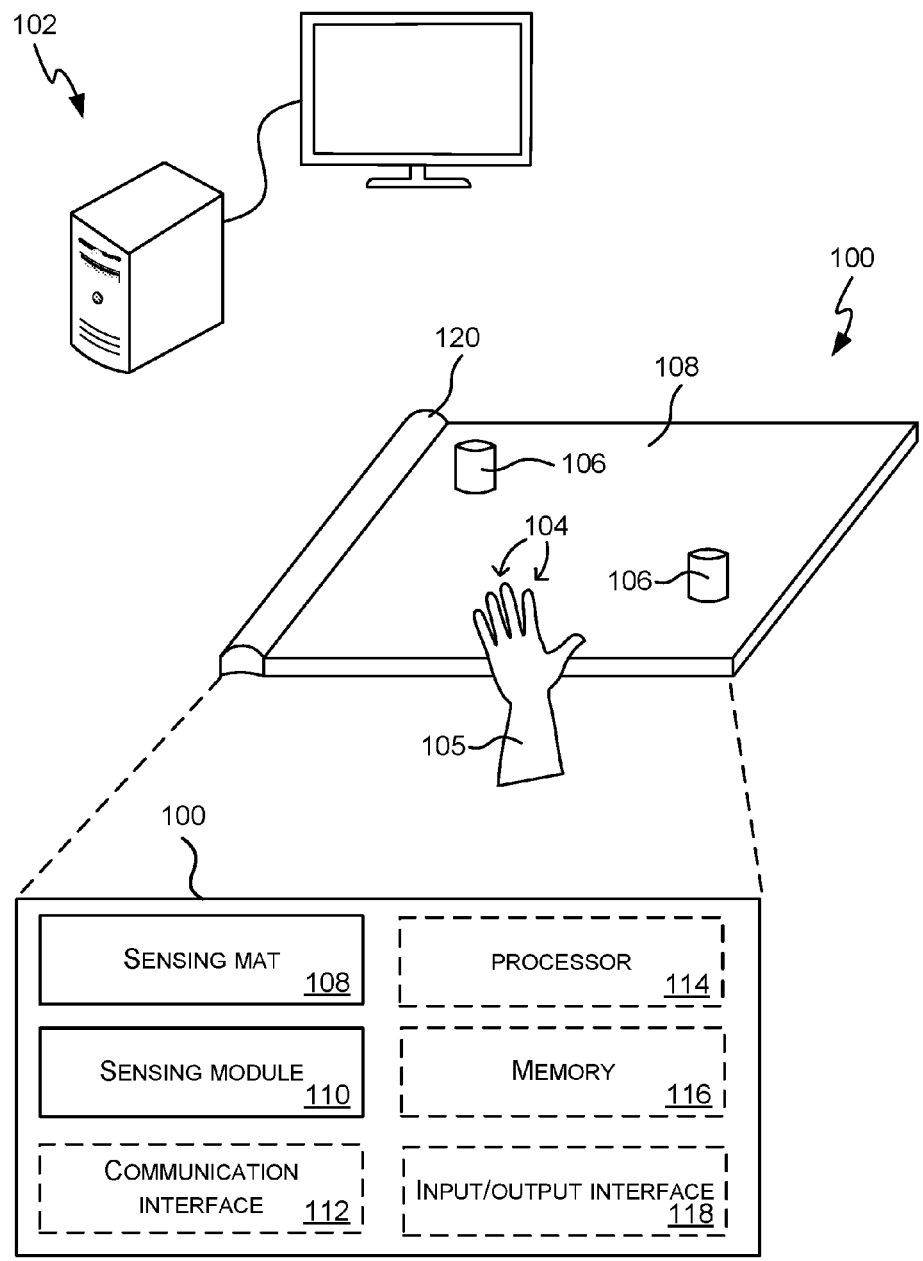
FIG. 1 is a schematic diagram showing a sensing surface device.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As described above, some touch-sensitive surfaces can only detect objects which are physically in contact with the surface and others can detect objects which are proximate to, but not in contact with, the surface. The embodiments described below are not limited to implementations which solve any or all of the disadvantages of known sensing surfaces.

Described herein is a sensing surface device which comprises a sensing mat (e.g. a single sensing area or a plurality of sensing areas) and a sensing module which is coupled to the sensing mat and configured to detect the position of objects and/or a user's fingers when in contact with the sensing mat. As described in more detail below, depending upon the way that the sensing mat is implemented, the sensing module may additionally be able to identify an object (e.g. by reading a short-range wireless tag in the object) on or near the sensing mat. The sensing module is also configured to detect an event associated with an object on the sensing mat and a separate movement at another position on the sensing mat. The sensing module is further configured to generate an input based at least on a combination of the detected event and the detected movement, where the input triggers one of a set of possible actions within software which may be running on the sensing surface itself or on a separate computing device which is in communication with the sensing surface (e.g. the computing device and the sensing surface may be connected via a wired or wireless link, e.g. via USB, Bluetooth™ or WiFi™).

In various examples, the sensing surface device described herein comprises a sensing module which is configured to detect the position of a first object and to detect an event associated with that first object. In response to detecting movement of a second object (or of more than one other object on the sensing mat), the sensing module determines whether the movement of the second object is correlated with the detected event associated with the first object (e.g. based on temporal and/or spatial correlation) and dependent upon the outcome of this determination, generates a selected input to software running on the sensing surface or a separate computing device (e.g. a first input in response to a positive correlation and a second, different input in response to a negative correlation).

In various examples, the sensing surface device described herein comprises a sensing module which is configured to detect the position of a first object and to detect a user interaction with that first object (the event). In response to detecting a gesture or touch-event at another position on (or above) the sensing mat, the sensing module generates an input to software running on the sensing surface or a separate computing device, where this input is generated based on both the detected user interaction and the detected touch-event/gesture. The user interaction and the separate touch event/gesture together define the input that is generated by the sensing module and either alone (e.g. the user interaction or the touch event/gesture) does not generate an input.

FIG. 1 is a schematic diagram showing a sensing surface device 100 which may be integrated within a computing device or may operate as a peripheral device (e.g. an input device) for a separate computing device 102 and may communicate with the separate computing device 102 using wired or wireless technologies (e.g. USB, Bluetooth™, Wi-Fi™, etc.). The sensing surface 100 is capable of detecting and locating one or more objects 106 on the surface and may additionally be capable of detecting and locating multi-touch user input (e.g. a user's fingers 104) and/or gestures. If any of the objects 106 include a wireless tag, the sensing surface 100 may also be capable of identifying those objects 106 by reading the wireless tag(s).

As shown in FIG. 1, the sensing surface device 100 comprises a sensing mat or pad 108 and a sensing module 110. The sensing surface device 100 may also comprise a communication interface 112 arranged to communicate with the separate computing device 102. In other examples, however, the sensing surface device 100 may be integrated with a computing device (e.g. such that it comprises a processor 114, memory 116, input/output interface 118, etc.).

The sensing module 110 is configured to detect at least the positions of objects 106 on the surface and may additionally be configured to detect a user touching the surface (e.g. with their fingers 104) or a user gesturing on/above the surface (e.g. with their fingers 104 and/or their hand/arm 105).

The sensing mat 108 may comprise one or more sensing arrays, e.g. a capacitive sensing electrode array and/or one or more arrays of RF antennas, as can be described with reference to FIG. 2, and in various examples the sensing mat 108 may be a multi-layer structure comprising one array overlaid over another array. Where the sensing mat 108 comprises two different arrays which use different sensing techniques, the sensing mat 108 (and hence the sensing surface device 100) may be described as being multi-modal.

Figure 2:
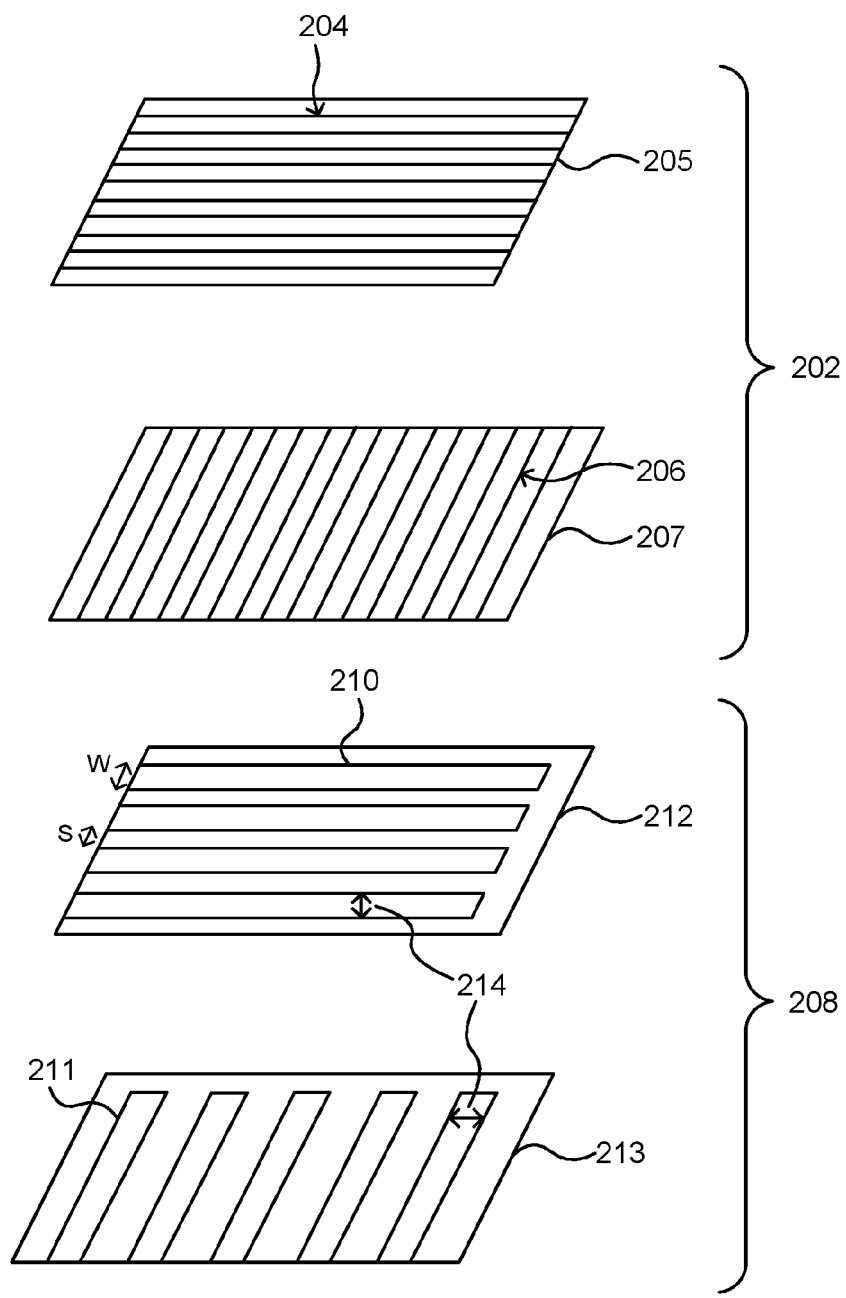
FIG. 2 is a schematic diagram showing the sensing mat from a sensing surface device in more detail.

FIG. 2 shows examples of two different arrays 202, 208 and as described above, the sensing mat 108 may comprise one or both of these arrays. The first array shown in FIG. 2 is a capacitive sensing electrode array 202 and the second array is an array of RF antennas 208 and in examples where the sensing mat 108 comprises both arrays, the capacitive sensing electrode array 202 may be positioned above the array of RF antennas 208 (e.g. when in the orientation shown in FIG. 1 and with a user touching the uppermost, touch surface of the first part 108, as indicated by the hand 105 in FIG. 1), i.e. the capacitive sensing electrode array 202 is closer to the touch surface than the array of RF antennas 208. Having the capacitive sensing electrode array 202 closer to the touch surface than the array of RF antennas 208 enables the array of RF antennas to provide a shield beneath the capacitive sensing layer (e.g. to prevent false detection caused by objects underneath the sensing surface) and a ground touch return path for user's fingers.

In various examples where the sensing mat 108 comprises both arrays 202, 208, the two arrays 202, 208 may be substantially the same size so that the arrays overlap completely. In other examples, however, the two arrays may not be the same size (e.g. the capacitive sensing electrode array 202 may be larger than the array of RF antennas or vice versa) and/or the arrays may be partially offset from each other so that they do not overlap completely and such that there are portions of the sensing surface which are multi-modal (i.e. where the two arrays overlap) and there are portions of the sensing surface which are not (i.e. where there is only one of the two arrays 202, 208).

The capacitive sensing electrode array 202 shown in FIG. 2 comprises a first set of electrodes 204 in a first layer 205 and a second set of electrodes 206 in a second layer 207. In the example shown in FIG. 2 the two sets of electrodes 204, 206 are arranged perpendicular to each other such that one set may be referred to as the x-axis electrodes and the other set may be referred to as the y-axis electrodes. In other examples, however, the sets of electrodes may be arranged such that they are not exactly perpendicular to each other but instead the electrodes cross at a different angle. The sets of electrodes 204, 206 are separated by some insulation which may be in the form of an insulating layer (not shown in FIG. 2) or insulation over the wires that form one or both of the sets of electrodes 204, 206.

The array of RF antennas 208 shown in FIG. 2 comprises a plurality of loop antennas and the example in FIG. 2 the array 208 comprises two sets of antennas 210, 211 in two separate layers 212, 213; however, in other examples, the array of RF antennas 208 may comprise only a single set of antennas (i.e. one of the two sets 210, 211 shown in FIG. 2 may be omitted). Two sets of antennas, as shown in FIG. 2 may be provided to enable the sensing surface 100 to distinguish between two objects at different locations but which are both proximate to the same RF antenna (such that if there was only one set of antennas, a single RF antenna would be able to read the tags in both objects). Such a row/column arrangement of RF antennas (comprising two sets of antennas 210, 211 as shown in FIG. 2) also enables the sensing surface to scale better (i.e. to larger sizes of sensing surface) and makes scanning across the area to find an object faster. In an alternative arrangement, a matrix (or grid) of individual antennas (e.g. m by n antennas arranged in a grid) may be used. Such a grid does not scale as well as the arrangement shown in FIG. 2, but may enable addressing of an object at a known location to be performed faster.

In the example shown in FIG. 2 the two sets of antennas 210, 211 are arranged perpendicular to each other in a row/column matrix such that one set may be referred to as the x-axis antennas and the other set may be referred to as the y-axis antennas. In other examples, however, the sets of antennas may be arranged such that they are not exactly perpendicular to each other but instead the antennas cross at a different angle or there may be only a single set of antennas (i.e. one of the sets 210, 211 is omitted). The two sets of antennas 210, 211 are separated by some insulation which may be in the form of an insulating layer (not shown in FIG. 2) or insulation over the wires that form one or both of the sets of antennas 210, 211.

In examples where the sensing surface device 100 comprises both arrays, 202, 208, the two arrays 202, 208 are separated by a distance (e.g. by an insulating layer also not shown in FIG. 2) in order to reduce the mutual capacitance between the capacitive sensing electrodes and the 'ground' layer provided by the NFC antennas.

As shown in FIG. 2, the RF antennas may be substantially rectangular loop antennas with a width (as indicated by arrows 214) which is close to the sizes of wireless tag used in any objects which are to be identified. For example, the width may be around 25 mm, with typical tag diameters being 17 mm, 22 mm, 25 mm, 30 mm and 35 mm, although larger tags are available (e.g. 50 mm diameters). Alternatively, other shapes of loop antenna may be used.

The loop antennas within each of the two sets 210, 211 may be equally spaced (where this spacing, s, between antennas is not necessarily the same as the width, w, of an antenna) or unequally spaced (and as described above, in some examples the antenna array 208 may only comprise a single set of antennas). Unequal spacing may, for example, be used to achieve variable resolution at various points on the sensing surface (e.g. to provide a sensing surface with lower resolution towards the edges and higher resolution in the middle) and this may, for example, enable the same number of antennas to be used for a larger sensing surface and for a smaller sensing surface. In an example, the loop antennas may be spaced so as to provide good coverage of the whole surface and to alleviate the effects of any nulls in the signal response of a single antenna.

The sensing mat 108 may, for example, be formed in a multi-layer flex circuit or using an embroidery of conductive traces onto a flexible substrate (e.g. woven into a fabric) to provide a flexible, yet robust, surface area. In an example, the sensing 108 may be sufficiently flexible that when not in use it can be rolled up around a second part 120 (which comprises the active electronics, e.g. the sensing module 110 and other optional elements 112-118) which may be rigid, e.g. for storage. In other examples, however, there may be no clear distinction between the sensing mat 108 and the electronics (e.g. the sensing module 110 and other optional elements 112-118) and instead the sensing module 110 etc. may be integrated within the sensing mat 108 or the distinction may be less (e.g. the sensing module 110 etc. may be formed in one or more additional layers underneath the sensing mat 108).

In examples where the sensing mat 108 comprises a capacitive sensing electrode array 202, the sensing module 110 (which may comprise a microprocessor control unit, MCU) is coupled to the capacitive sensing electrode array 202 and may be configured to detect both a decrease and an increase in the capacitance between electrodes in the array. A decrease of mutual capacitance between electrodes (i.e. between one or more electrodes in the first set of electrodes 204 and one or more electrodes in the second set of electrodes 206) is used to detect a user's fingers in the same way as conventional multi-touch sensing. Unlike conventional multi-touch sensing, however, the first sensing module 602 may also be configured to detect an increase in the capacitance between electrodes in the array. An increase in mutual capacitance between electrodes (i.e. between one or more electrodes in the first set of electrodes 204 and one or more electrodes in the second set of electrodes 206) is used to detect the position, and in various examples, also the shape, of a conductive object, such as a wireless tag (e.g. an NFC or RFID tag) in a non-conductive housing or other object formed from a conductive material (without a tag). Unlike a user's finger, such an object has no connection to ground and instead it capacitive couples adjacent electrodes (consequently, the object does not need to have a high electrical conductivity and instead can be made from, or include, any conductive material).

In examples where the sensing mat 108 comprises an array of RF antennas 208, the sensing module 110 is coupled to the array of RF antennas 208 and is configured to selectively tune and detune the RF antennas in the array. For example, the second sensing module 604 may deactivate all but a selected one or more RF antennas and then power the selected RF antennas such that they can activate and read any proximate wireless tags (where the reading of tags using a selected antenna may be performed in the same way as a conventional NFC or RFID reader). Where more than one RF antenna is tuned and powered at the same time, these antennas are selected to be sufficiently far apart that there is no effect on one powered RF antenna from any of the other powered RF antennas. The deactivation of an RF antenna may be implemented in many different ways, for example by shorting the two halves of the loop via a transistor or making the tuning capacitors (which would otherwise tune the antenna at the right frequency) open-circuit (using a transistor). This selective tuning and detuning of the RF antennas stops the antennas from coupling with each other (e.g. such that the power is not coupled into another antenna, which may then activate tags proximate to that other antenna and not the original, powered antenna).

In examples where the sensing mat 108 comprises both a capacitive sensing electrode array 202 and an array of RF antennas 208, the sensing module 110 may be further configured to connect all the RF antennas to ground when detecting touch events using the capacitive sensing electrode array 202. This prevents the capacitive sensors from sensing activity on the non-touch-side of the sensing mat (e.g. legs under the table) and provides the capacitive return path to ground (which completes the circuit of the user's finger to the sensing electrodes to ground and to the user's body).

Depending upon the implementation of the sensing surface device 100, it may also comprise a communication interface 112 arranged to communicate with a separate computing device 102 using a wired or wireless technology. In various examples, the communication interface 112 may, in addition or instead, be arranged to communicate with an object 106 (e.g. following identification of the module by the sensing module 110).

In various examples, the sensing surface device 100 may be integrated with a computing device such that it further comprises the component parts of the computing device, such as a processor 114, memory 116, input/output interface 118, etc. In other examples, the sensing surface device 100 may be integrated within a peripheral for a separate computing device 102 e.g. within a keyboard.

In various examples, the sensing module 110 may be arranged to detect gestures above the surface of the sensing mat 108 as well as fingers or conductive objects in contact with the surface. The sensing module 110 may therefore additionally comprise a gesture recognition module coupled to the capacitive sensing electrode array 202 (e.g. where the gesture is made by a user with their fingers on or close to the array 202) or to another sensing layer capable of detecting gestures (e.g. an array of RF antennas if the gesture is made by a user holding an object comprising a short-range wireless tag).

The functionality of the sensing module 110 described herein may be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), Systemon-a-chip systems (SOCs), Complex Programmable Logic Devices (CPLDs), Graphics Processing Units (GPUs).

In examples where the sensing surface device 100 is integrated with a computing device such that it further comprises the component parts of the computing device, such as a processor 114, memory 116, input/output interface 118, etc. the processor 114 may be a microprocessor, controller or any other suitable type of processor for processing computer executable instructions to control the operation of the device in order to implement functionality of the computing device (e.g. to run an operating system and application software).

The operating system and application software may be provided using any computer-readable media that is accessible by the sensing surface device 100. Computer-readable media may include, for example, computer storage media such as memory 116 and communications media. Computer storage media, such as memory 116, includes volatile and non-volatile, removable and non-removable media implemented in any method or technology for storage of information such as computer readable instructions, data structures, program modules or the like. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Propagated signals per se are not examples of computer storage media. Although the computer storage media (memory 116) is shown within the sensing surface device 100 it will be appreciated that the storage may be distributed or located remotely and accessed via a network or other communication link (e.g. using communication interface 112).

The sensing surface device 100 may also comprise an input/output interface 118 arranged to output display information to a display device which may be separate from or integral to the sensing surface device 100. The display information may provide a graphical user interface. The input/output interface 118 may also be arranged to receive and process input from one or more devices, such as a user input device (e.g. a mouse, keyboard, camera, microphone or other sensor). In some examples the user input device may detect voice input, user gestures or other user actions and may provide a natural user interface (NUI). The input/output interface 118 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Figure 3:
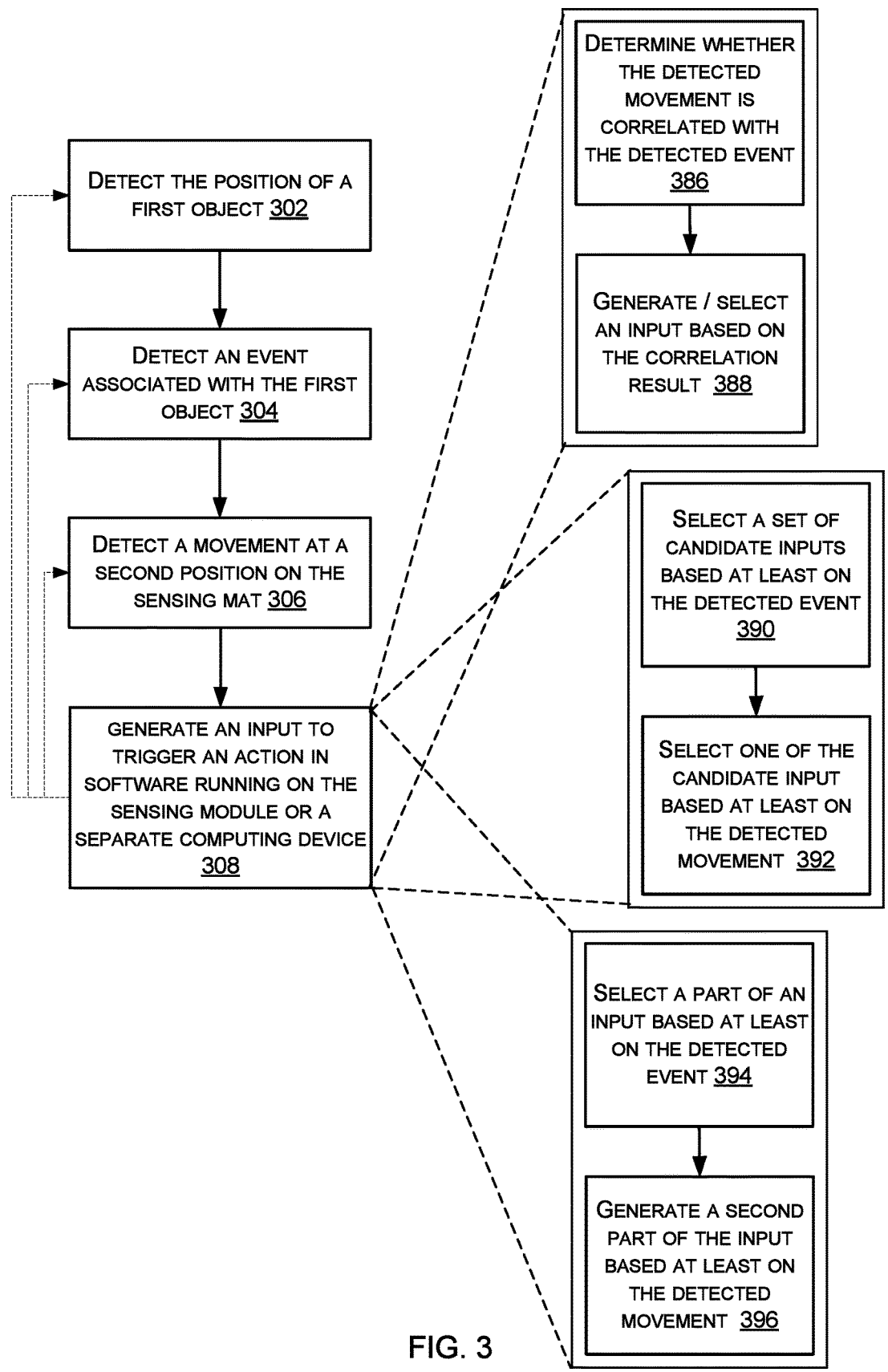
FIG. 3 is a flow diagram showing example methods of operation of the sensing surface device of FIG. 1.

FIG. 3 is a flow diagram showing example methods of operation of the sensing surface device 100 (and in particular the sensing module 110). As shown in FIG. 3, the position of a first object on the sensing mat 108 is detected (block 302, e.g. by the sensing module 110 using inputs received from the sensing mat 108) and this position may be referred to as the first position. An event associated with the first object is also detected (block 304, e.g. by the sensing module 110 using inputs received from the sensing mat 108). The event may, for example, be an operation that has been performed by the first object such as the firing of a projectile or a jet of air, the presence of another object on or attached to the first object (e.g. a ball rolling over the first object), a user interaction with the first object and various examples are described in more detail below. In various examples, where this event involves another object (e.g. a projectile or an object which is attached to or on the first object), that object may not be able to be detected by the sensing mat (e.g. it may not comprise a short-range wireless tag which could be read by an array of RF antennas and/or it may not be in contact with the sensing surface and so cannot be detected by a capacitive sensing electrode array and/or it may not comprise any sensors which can communicate sensor data to the sensing module).

In various examples, the detecting of the position (in block 302) may be performed by the sensing module 110 using a capacitive sensing electrode array or an array of RF antennas. Similarly, the detecting of the event (in block 304) may be performed by the sensing module 110 using a capacitive sensing electrode array or an array of RF antennas.

In response to detecting a movement at a second position on the sensing mat 108 (block 306, e.g. by the sensing module 110 using inputs received from the sensing mat 108), an input to software running on the sensing device 100 or a separate computing device 102 is generated (block 308, e.g. by the sensing module 110), where the input is generated based at least on a combination of the detected event and the detected second position on the sensing surface. The input which is generated (in block 308) triggers an action within the software.

The movement at the second position that is detected (in block 306) may be the movement of a second object on the sensing mat or the movement of a user's fingers 104 or hand 105 (e.g. in the form of a touch event, series of touch events or a gesture). The detection of the movement of an object may be performed by the sensing module 110 using a capacitive sensing electrode array or an array of RF antennas. However, if the movement is of a user's fingers/hand (e.g. in the form of a touch event or gesture) then this can only be detected using a capacitive sensing electrode array.

The generation of the input (in block 308) may be performed in a number of different ways and two examples are described below: the first with reference to FIGS. 4-8 and the second with reference to FIG. 9. It will be appreciated that whilst these two examples are described separately, a sensing surface device 100 may implement one or both of these examples.

As described in more detail below, the method (or parts thereof) may be repeated as indicated by the dotted arrows in FIG. 3. For example, elements of the method may be repeated to detect further events and/or further movement (e.g. movement of other objects) such that an input may be generated (in block 308) based on a single detected event and a single detected movement or based on the combination of one or more detected events and one or more detected movements.

In a first example, the method comprises determining whether the detected movement is correlated with the detected event (block 386, e.g. using the sensing module 110) and then dependent upon whether the correlation result is positive (indicating that the event and movement are correlated) or negative (indicating that the event and movement are not correlated) a different input/action is selected (block 388, e.g. using the sensing module 110). In such examples, the movement which is detected at the second position (in block 306) is the movement of a second object and the determination which is performed (in block 386) may use spatial and/or temporal aspects to determine whether the event associated with the first object (as detected in block 304) and the movement of the second object (as detected in block 306) are correlated. This example is described in more detail below with reference to FIGS. 4-8.

Figure 4:
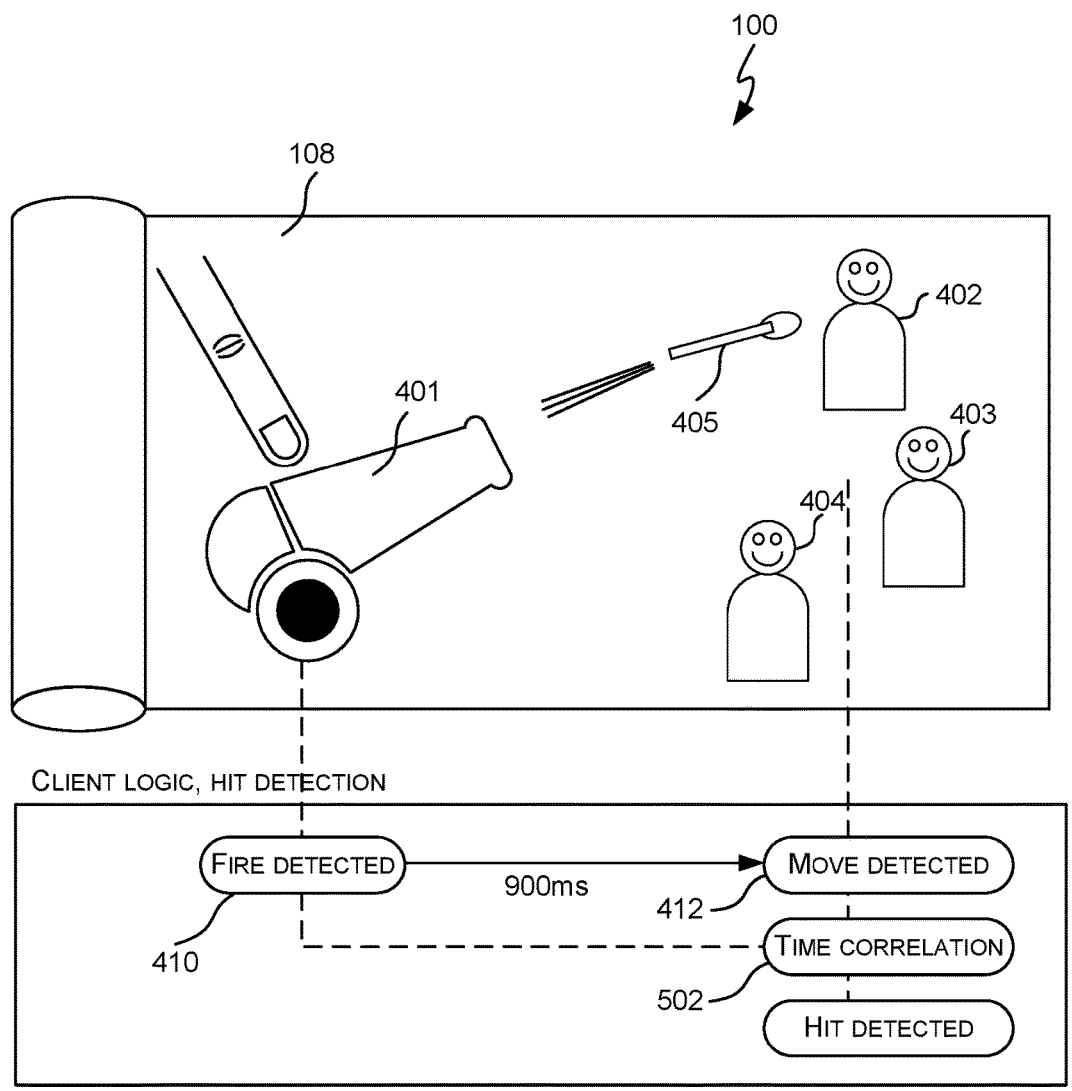
FIG. 4 is a schematic diagram illustrating an example of the operation of the sensing surface device of FIG. 1.

FIG. 4 shows a schematic diagram of a sensing surface device 100 and four objects 401-404 on the sensing mat 108. In this example, the four objects are all toy characters with one object being a cannon (object 401) and the other objects being pirates (objects 402-404), although it will be appreciated that the objects may have any shape. A fifth object 405 is also shown which is not on the sensing mat 108 but instead moves above the sensing mat 108 and its presence, position or motion cannot be detected by the sensing mat 108.

Using the methods described herein, the sensing surface (and in particular the sensing module 110) can infer the motion of the fifth object 405 and trigger actions within software based on this inferred motion. The methods described herein therefore enable the software to respond to the motion of an object which is invisible to the sensing surface. This avoids the need for the fifth object to be augmented with a wireless tag/sensor to make it visible to the capacitive electrodes and/or RF antennas in the sensing surface (which would increase the weight of the fifth object and the complexity of the system) and avoids the need for provision of a further sensing modality which can detect the fifth object above the surface (e.g. a camera tracking system which would add both complexity and bulk to the sensing surface). It may also enable sensing of things that cannot have sensors attached to it and/or are otherwise not able to be sensed (e.g. a jet of air).

The sensing module 110 within the sensing surface device 100 detects the position of each of the four objects 401-404 on the surface (including detecting the position of the first object at a position P1 in block 302). The detecting of the positions of the four objects 401-404 may be performed using a capacitive sensing electrode array 202 (as described above) or an array of RF electrodes 208 (as described above) e.g. where each object comprises a short-range wireless tag.

In examples where the sensing surface comprises an array of RF electrodes (irrespective of whether they are used to detect the position of the objects or not) and an object comprises a short-range wireless tag, the sensing surface may read data (e.g. including an identifier) from the short-range wireless tag in an object and this may be used, in various examples, to determine the frequency at which the object should be activated in order to read data (e.g. the identifier and optionally state information) from the short-range wireless tag in the object. For example, if data is read from all four objects 401-404 on the sensing surface in FIG. 4, the data (e.g. an identifier within the data or state information within the data) may identify an object where an event can occur and such objects can then be polled more frequently by the sensing surface (e.g. by activating a proximate RF antenna) than other objects. In such an example, the sensing module 110 may update the sequence in which RF antennas (within the array of RF antennas) are activated and/or the length of time of any activation based on data read from objects on the sensing mat 108.

The sensing module 110 within the sensing surface 100 may detect an event 410 which corresponds of the firing of the fifth object 405 from the first object 401 (block 304). The detection of the event 410 may be performed using the array of RF antennas 208, e.g. by polling the object (i.e. the short-range wireless tag in the object) and detecting a change in state (e.g. from 'not fired' to 'fired') from the data read from the object. The time of the event detection, T1, may be the time that the data was read from the object by the sensing module 110 or, in various examples, the first object may store within local memory a timestamp, T1, indicating the time of the event (e.g. the time at which the fifth object was fired from the first object) and the next time the short-range wireless tag within the first object 401 is activated by one of the RF antennas, the timestamp may be communicated and hence be read by the sensing surface 100 and this timestamp, T1, may be used as the time of the event.

The detection of the event 410 may alternatively be performed using the capacitive sensing electrode array 202. For example, the button that fires the fifth object may be made from a conductive material such that pressing the button has two effects—the firing of the fifth object and completing a conductive path down to a metal electrode in contact with the sensing surface. Pressing the button in such examples therefore registers as a touch event (as detected using the capacitive sensing electrode array 202) under the object itself and this can be used to signal the detection of the event.

In various examples, the detection of the event 410 may be performed using the capacitive sensing electrode array 202 by detecting a capacitive footprint of the object that fires the fifth object and the object may change its capacitive footprint to reflect the change in state from 'not fired' to 'fired' (e.g. using a switching arrangement within the object that selectively short circuits or otherwise connects to or more conductive regions on a face of the object together and/or which changes the relative position of two or more of the conductive regions on the face of the object that is in contact with the capacitive sensing electrode array 202).

The term 'capacitive footprint' is used herein to refer to the pattern which is detectable by a capacitive sensing electrode array when the object is placed in contact with the array. The footprint is a consequence of the arrangement of conductive regions on the face of the object which is in contact with the capacitive sensing electrode array and any electrical connections between the conductive regions.

In such examples, the detection of the event 410 may be performed by a sensing module coupled to the capacitive sensing electrode array and which is configured to compare a first capacitive footprint of an object detected using the capacitive sensing electrode array at a first time (e.g. in a first frame) to one or more reference footprints (e.g. an 'on' reference footprint and an 'off' reference footprint) or to a second capacitive footprint of the object detected using the capacitive sensing electrode array at a second time (e.g. in a second frame). Where reference footprints are used, the sensing module determines whether the first capacitive footprint matches one of the reference footprints and where a second capacitive footprint is used, the sensing module determines whether the first and second capacitive footprints are the same or different. The sensing module may be implemented in hardware and/or software.

If, either following or shortly before detection of an event (at time T1) associated with an object at a known position P1 on the surface, motion 410 is detected at a separate position on the sensing surface (block 306), where this motion may be detected at a time T2 and position P2 (where P1≠P2), then the sensing module 110 determines whether the detected motion is correlated to the detected event (block 386, e.g. whether the detected motion is a result of another object being impacted by the fifth object). An input to software running on the sensing surface 100 or a separate computing device 102 is generated based on the results of this determination (e.g. generating input A which triggers action A in response to determining that the detected motion 412 is correlated with the event 410 or generating input B which triggers action B in response to determining that the detected motion 412 is not correlated with the event 410).

In the example shown in FIG. 4, the detected motion 412 is motion of a second object 402 which occurs 900 ms after the detected event 410 and the action which is triggered may be the playing of a first sound (sound A) if the detected motion is correlated with the event and the playing of a second, different sound (sound B) if the detected motion is not correlated with the event.

Figure 5:
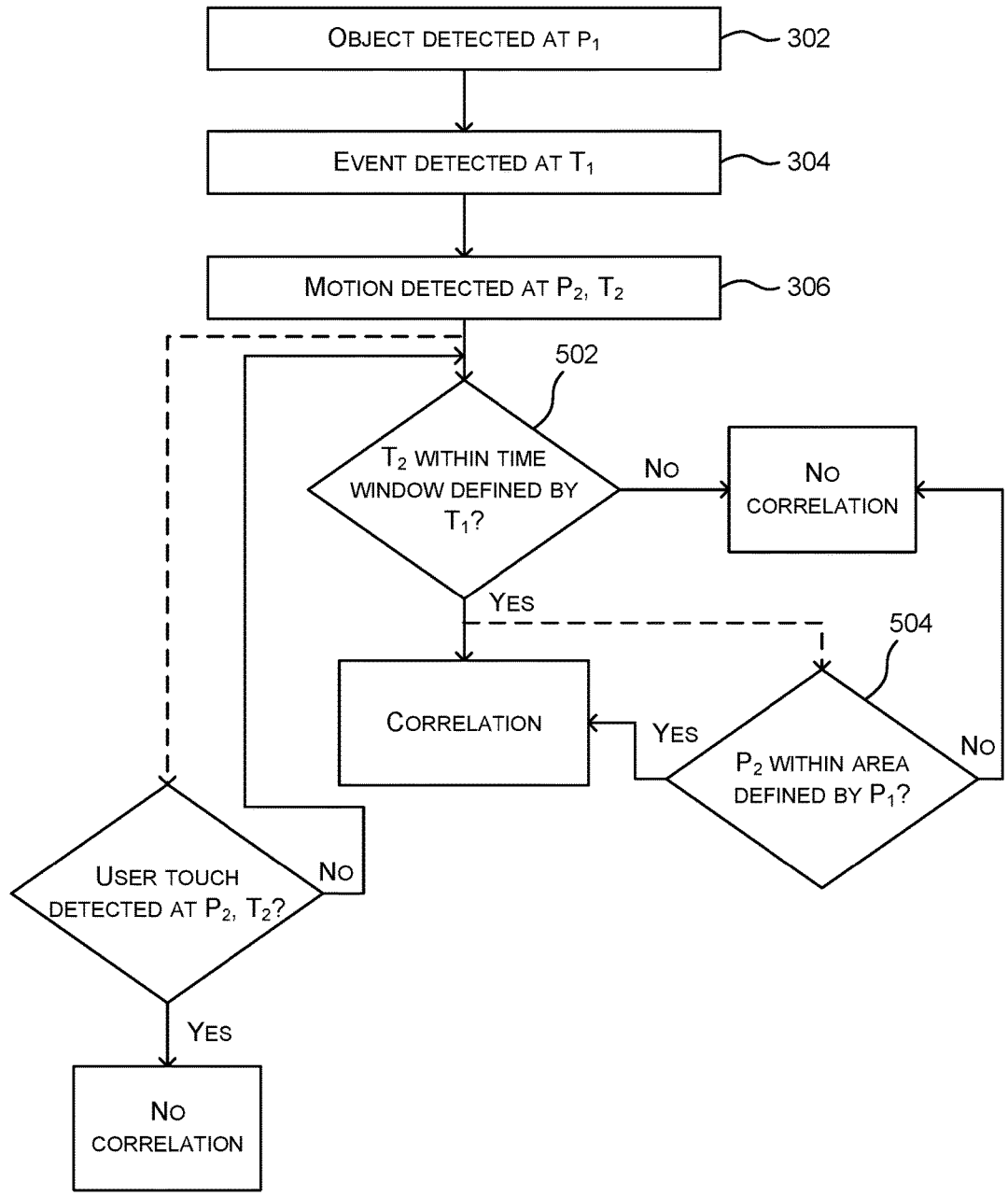
FIG. 5 is a flow diagram showing another example method of operation of the sensing surface device of FIG. 1.

The determination (in block 386) of whether the event and the detected motion are correlated may be based on time and/or position as can be described with reference to the flow diagram in FIG. 5. In this example, the determination is performed by determining whether the time at which the motion was detected, T2, is within a time window defined by the time of the event, T1 (block 502). The time window may a period of time which starts at the time of the event, T1, and extends for a pre-defined period of time, $\Delta T$, such that there is a correlation ('Yes' in block 502) if $T1 \leq T2 \leq (T1+\Delta T)$. In other examples, e.g. where the event may have occurred prior to its detection by the sensing module 110, the period of time may start prior to the detected time of the event. For example, if the sensing module 110 only polls the first object every 30 ms, then it may read data indicating that the event has occurred (e.g. data indicating a change of state from 'not fired' to 'fired') up to 30 ms after the event actually occurred. Consequently, in such an example the movement may be detected prior to the detection of the event and it may be determined that there is a correlation ('Yes' in block 502) if $(T1-30 \text{ ms}) \leq T2 \leq (T1+\Delta T-30 \text{ ms})$.

The length of the time window, $\Delta T$, may be the same for all objects on the sensing mat 108 or may be a variable which is calculated based on the separation of the object from the first object, e.g. it may be a function of the distance between P1 and P2 and may be calculated based on a known range of possible speeds for the fifth object 405.

In addition to (or instead of) performing the determination (in block 386) based on time, it may be performed based on the position data, e.g. based on P1 and P2. In such examples, an area on the sensing mat 110 may be defined based on P1 (e.g. a circle around P1 or a sector of a circle, where the position/orientation of the first object is known and this restricts the possible direction of travel of the fifth object 405) and the determination is performed by determining whether the position of the movement, P2, falls within this area defined by P1 (block 504).

In various examples, the sensing module 110 may be able to detect whether a user was touching the object that moved (e.g. the second object 402) and in various examples, the sensing module 110 may filter out motion of objects that were being held by a user at the time (or immediately before/after) the motion was detected (block 506, e.g. because if the object was being held by a user the resulting motion is likely to be caused by the user and not an impact from the fifth object). Detection of whether a user is holding an object may, for example, be made by the sensing module 110 depending on whether an increase in capacitance is detected using a capacitive sensing electrode array. In other examples, the object may comprise one or more sensors capable of detecting whether it is being held (e.g. an accelerometer to detect slight tremors or movements, temperature sensors or light sensors, or capacitive touch sensors). Such sensors may provide finer grained information on whether a user is holding the object, e.g. which part of the object is being held and the sensing module 110 may filter out motion of objects according to which part (if any) is being held by a user.

In various examples, the sensing module 110 may detect motion of more than one object (in block 306) and in such an example, the determination of whether the motion is correlated with the event may be performed independently for each object which moved (e.g. by repeating block 308 in FIG. 3 or blocks 502-506 in FIG. 5) and a separate action may be triggered in each case, or a single action may be triggered based on the outcome of the determination (in block 386 or blocks 502-506) for all of the objects that moved.

Figure 6:
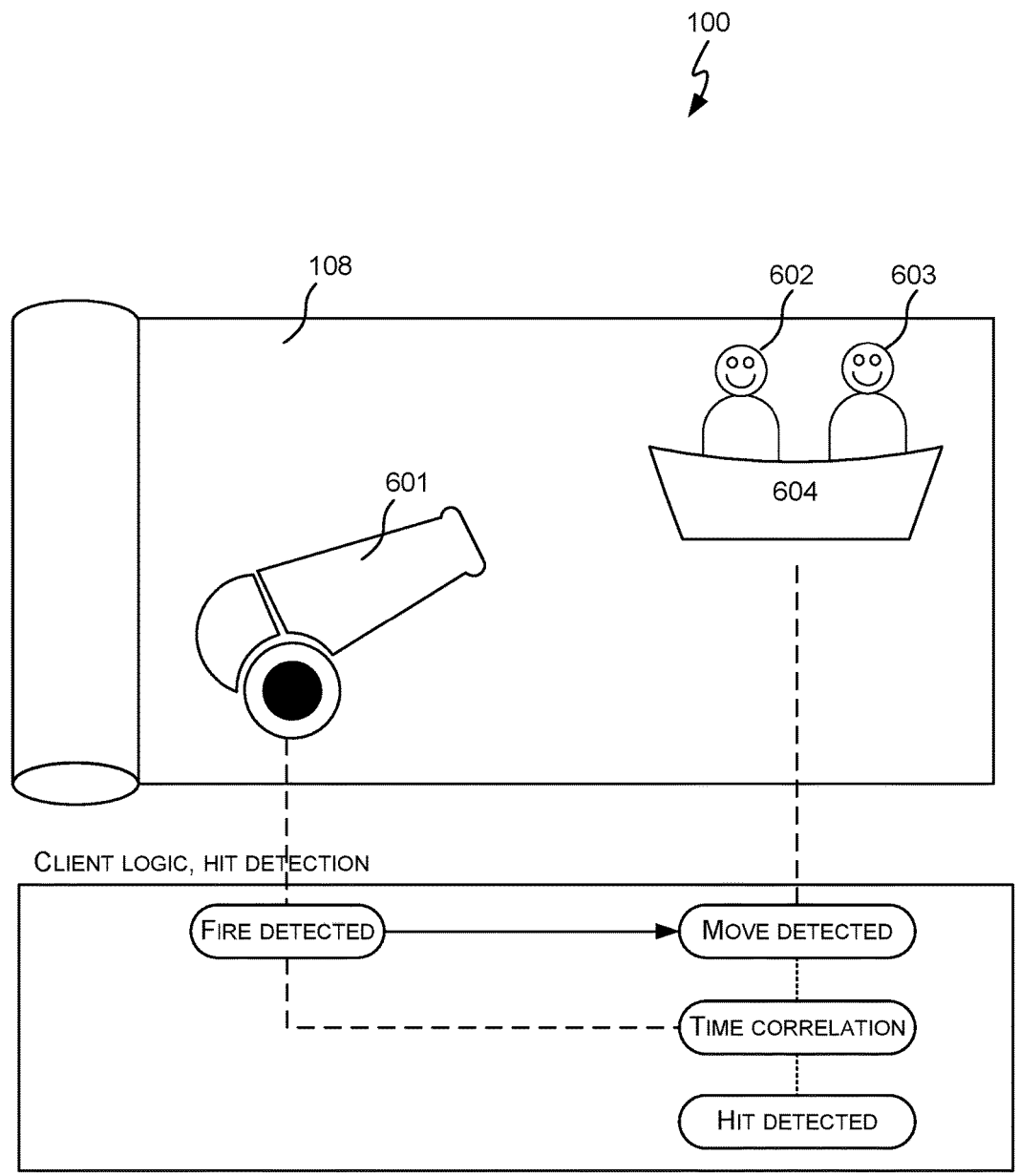
FIG. 6 is another schematic diagram illustrating an example of the operation of the sensing surface device of FIG. 1.

FIG. 6 shows a schematic diagram of a sensing surface device 100 and four objects 601-604 on the sensing mat 108. In this example two objects 602, 603 are on top of another object 604 but can all still be detected by the sensing module 110 (e.g. because an array of RF antennas is used and object 604 is sufficiently thin that it does not block the electromagnetic field generated by a proximate RF antenna). In this example, the sensing module 110 infers the trajectory of a projectile fired from a first object 601 dependent upon whether one or more of the other objects 602-604 moves and the sensing module 110 can also infer which objects are connected together. For example, if following a firing event detected associated with the first object 601, motion is detected simultaneously for the other three objects 602-604 and the motion of all three objects is determined to be correlated to the detected event, the sensing module 110 can infer that all three objects are connected together and the base object (e.g. boat 604) was hit by the projectile and in response to this a particular input (corresponding to a particular action) may be generated (in block 308). If, however, the sensing module 110 only detects motion of one of the three objects (e.g. pirate 602) and this motion is determined to be correlated to the detected event, then a different input (corresponding to a different action) may be generated (in block 308). In other examples, the base object 604 may not be visible to the sensing mat 108 (e.g. it may not comprise a short-range wireless tag and/or it may be made from a non-conductive material) and in such examples, the sensing module may infer that the objects 602-603 are connected in some way if they move together.

Figure 7:
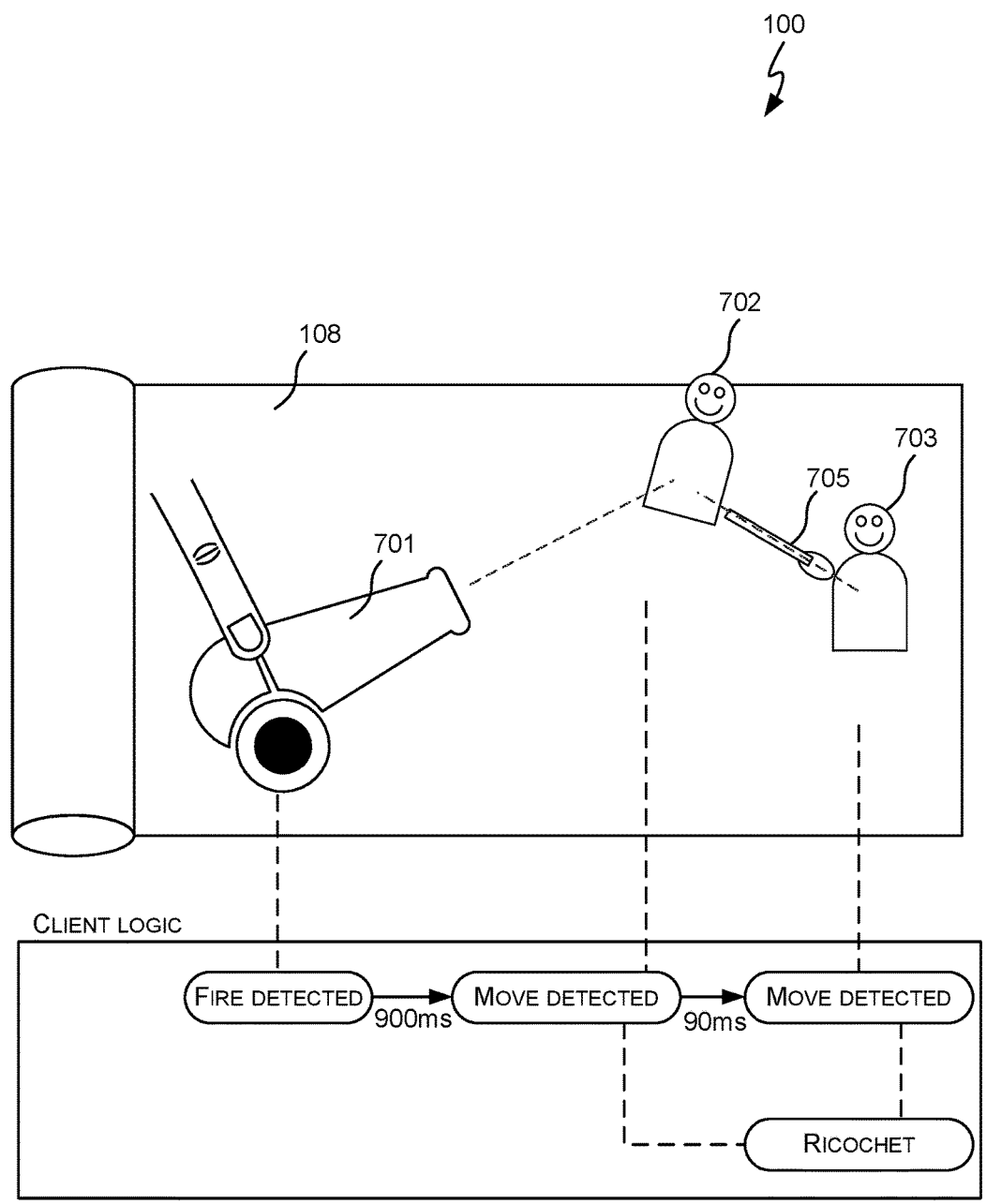
FIG. 7 is a further schematic diagram illustrating an example of the operation of the sensing surface device of FIG. 1.

FIG. 7 shows a schematic diagram of a sensing surface device 100 and three objects 701-703 on the sensing mat 108. In this example, the sensing module 110 detects an event (in block 304) followed by motion of two objects 702, 703 at two different positions, P2, P3 and two different times, T2, T3 and the determination (in block 386) is performed twice and from this it may be determined that the motion of the second object 702 (at time T2 and position P2)

is correlated with the event (at time T1 and position P1) and hence it can be inferred that the second object 702 was impacted by the projectile 705 fired from the first object 701 and which is not visible to the sensing device 100. The motion of the third object 703, however, does not correlate with the event at time T1 and position P1. In such an example, the motion of the second object may be considered to be a second detected event (at time T2 and position P2) and the method described above may be repeated to determine whether the other detected motion (e.g. of object 703 at time T3 and position P3) is correlated to this second event and if it is determined that the motion is correlated to the second event (e.g. because the object is impacted by the invisible object 705 after ricocheting off the second object), then a further input to the software may be generated (in block 308). In various examples, therefore, the detected movement (in block 306) may be used to generate an input (in block 308) and may also be considered to be a further detected event (in block 304) which may subsequently be used in generating a further input (in block 308).

The object which causes the motion (detected in block 306) may be a solid object, such as a projectile as described in the examples above or a ball rolling along an elevated path between objects above the sensing mat. In other examples, however, the projectile may not be a solid object but instead may be a jet of gas/liquid, e.g. it may be a jet of air (e.g. where the first object may be an air cannon which ejects the jet of air) or a jet of water.

Figure 8:
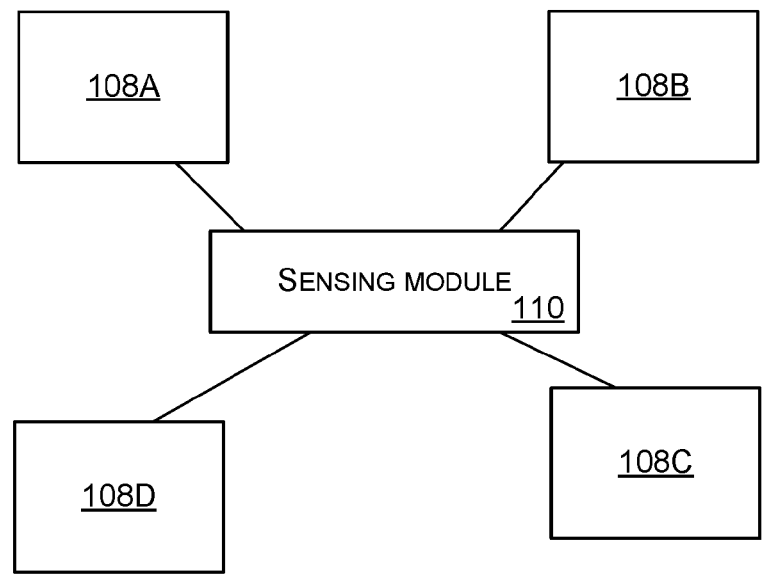
FIG. 8 is a schematic diagram of a segmented sensing mat.

Although in the examples shown in FIGS. 4, 6 and 7 show a single continuous area of sensing mat 108, the sensing mat 108 may instead be formed from a plurality of separate areas 108A-D as shown in FIG. 8, where each individual area of sensing mat 108A-D is connected to the sensing module 110

In a second example, the method of generating an input (in block 308 of FIG. 3) comprises selecting a candidate set of inputs/actions based at least on the detected event (block 390, e.g. using the sensing module 110) and then selecting one input/action from the selected candidate set based at least on the detected movement (block 392, e.g. using the sensing module 110). In this example, neither the event nor the movement on their own trigger an action but an action is triggered based on the combination of the detected event and the detected motion.

In the second example, the event which is detected (in block 304) is a user interaction with the first object, i.e. a user placing at a position P1 on the sensing mat 108, a user removing the first object from a position P1 on the sensing mat, a user touching the first object at position P1 on the sensing mat, a user connecting the first object to a second object at position P1 on the sensing mat, etc.

Figure 9:
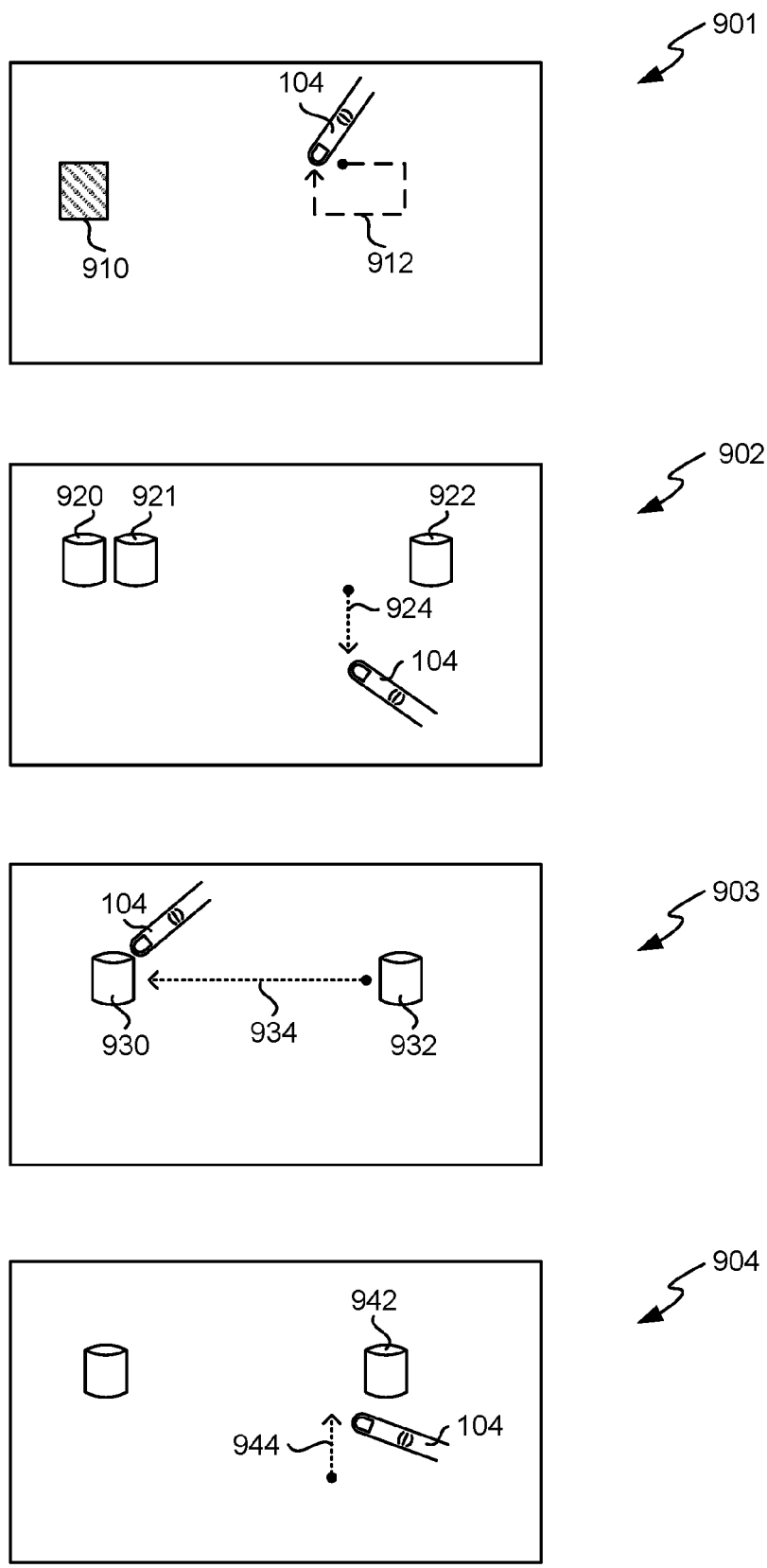
FIG. 9 is another schematic diagram illustrating an example of the operation of the sensing surface device of FIG. 1.

In this second example, the motion which is detected (in block 306) is not motion of another object on the sensing mat 108 but is instead the motion of a user's hand/fingers in a touch-event or gesture and various examples are shown in FIG. 9. The motion/gesture which is detected provides context to the detected event.

In a variation on this second example, a part of an input is selected based on the detected event (block 394) and the remaining part of the input (e.g. one or more parameters) are generated based at least on the detected movement (block 396) and together these two parts form a complete input which can be provided to the software to trigger an action.

In the first example 901 shown in FIG. 9, the event (as detected in block 304 by the sensing module 110) may be the placement of object 910 and the movement (as detected in block 306 by the sensing module 110) may be a user gesture (as indicated by dotted line 912) on or proximate to the sensing mat 108. A set of candidate actions/inputs is selected based on the event (in block 390 e.g. based on the identity of the first object which is associated with the detected event and/or based on the nature of the detected event) and one of the actions/inputs from the candidate set is then selected (in block 392) based on the detected gesture.

In other examples, an action may be selected based on the detected event (in block 394) and the detected movement (e.g. gesture) may provide parameters (in block 396) to quantify an aspect of the action (e.g. in terms of strength, magnitude, direction, position, etc.). For example, the object 910 may be a card or toy and the gesture 912 may indicate a size or position at which a virtual object corresponding to the physical object 910 should be drawn within a virtual scene in the software. In another example, the object 910 may be a toy aeroplane and the gesture 912 may indicate a trajectory of a virtual object corresponding to the physical object 910 within a virtual scene in the software.

In various examples, a number of events may be detected by the sensing module (in block 304), e.g. the placement of three objects 920-922 on the sensing surface, as shown in the second example 902 in FIG. 9, followed by a gesture 924. In this example, a set of candidate actions/inputs may be detected based on the detected event which has a position which is closest to the detected position of the gesture 924 (e.g. the placement of object 922) and then one of the actions/inputs from the candidate set is then selected (in block 392) based on the detected gesture 924.

For example, the three objects 920-922 may represent physical systems (e.g. lights, speakers, etc.) and by gesturing close to one or more of the objects, a user may be able to control the corresponding physical system (e.g. to increase/decrease the brightness of the lights or the volume of the speakers). In this way the objects and the sensing surface device act as a reconfigurable and intuitive control panel for a set of larger physical objects/systems. The objects which are placed on the sensing surface may be considered to be tokens for the actual objects/systems which are controlled through interaction with the sensing surface. To control different systems, a user may place the corresponding objects on the sensing surface and then perform gestures on the surface close to one or more of the objects. By grouping the objects together on the surface, a user may be able to control multiple systems at the same time (e.g. if a user gestured close to the group of objects 920-921 they may control that group of systems rather than the system corresponding to object 922) and reconfigure them by changing the grouping in an interactive and intuitive manner.

In a third example 903 shown in FIG. 9, a user may place two objects 930, 932 and this is detected as two events (in block 304). By performing a gesture 934 which connects the two objects, an action/input may be selected (from the candidate set triggered by the placement of an object) which pairs the two objects within the software (e.g. a Bluetooth™ pairing).

In a further example, shown in the fourth example 904 of FIG. 9, the combination of objects and gestures may be used to provide a tactile copy/paste buffer. By placing an object 942 on the sensing mat (as detected in block 304) a set of candidate actions may be identified (in block 390) and a gesture 944 proximate to that object 942 may cause selection of an input/action (in block 390) that associates a portion of content (e.g. text or an image) with the particular object 942 within the software (which may, for example, be an operating system). To subsequently paste that portion of content, the user may place the same object on the same or a different sensing surface (as detected in block 304) and then perform the opposite gesture (e.g. gesture 924, as detected in block 306) and this may trigger the selection of the "paste" action within the software for the content previously associated with the object 942.

In many of the examples described above with reference to FIG. 9, spatial filtering is performed to link an event and the gesture (e.g. such that the event is a user interaction with a proximate object). In various examples, temporal filtering may be used in addition or instead, e.g. such that the event is the most recently detected user interaction with an object as evaluated at the time the gesture is detected. Such that, for example, if in example 902 in FIG. 9, the sensing module 110 detects placement of the objects in the order: 922, 921, 920 and then detects the gesture 924, the input is generated (in block 308) based on the placement of object 920 (the most recently placed object) and the gesture 924, rather than the placement of object 922 (the closest placed object) and the gesture 924 as described above. In this example, the event and the gesture used to generate the input are temporally closest instead of being spatially closest.

The method of this second example may be repeated such that having detected an event and a movement (in blocks 304-306) and generated a first input (in block 308), detection of a further event (in block 304, e.g. the removal of the object placed in the first event or the placement of a second object on the sensing surface) may cause the generation of a second input based on a combination of the two detected events and the detected movement. Similarly, detection of a further movement (e.g. gesture) instead of a further event may cause the generation of a second input based on a combination of the detected event and the two detected movements.

In the examples described with reference to FIG. 9, a user is not holding or interacting with the objects at the same time as performing the gesture and the gesture is performed after and separately from the interaction with an object (which is the detected event). This enables a user, in various examples, to perform a two-handed gesture and/or to associate the gesture with multiple objects (e.g. 3 or more objects).

In an example, the method described above with reference to FIG. 9 may be used to implement an educational tool or tactile programming method. Each detected event may correspond to a user placing a particular object on the sensing mat, each object corresponding to a part of a software command and the gesture detected after the placement of an object may be used to determine one or more parameters to complete the command. The completed command may then be provided to the software (as part of the generated input in block 308) to trigger the execution of the command and/or the display of the command in a graphical user interface.

In various examples of the first and second examples described above the event may be detected (in block 304) using a first sensing modality (e.g. using the array of RF antennas) and the movement may be detected (in block 306) using a second sensing modality (e.g. using the capacitive sensing electrode array), but the sensing is performed by the same sensing surface 100 (e.g. by the same sensing module 110).

Although the present examples are described and illustrated herein as being implemented in a sensing system as shown in FIG. 1, the system described is provided as an example and not a limitation. As those skilled in the art will appreciate, the present examples are suitable for application in a variety of different types of sensing systems and the sensing mat, for example, may be of any size or shape and may be contoured instead of being flat (as shown in FIG. 1).

A first further example provides a sensing surface device comprising: a sensing mat; and a sensing module coupled to the sensing mat and configured to: detect a first object at a first position on the sensing mat; detect an event associated with the first object; detect a movement at a second position on the sensing mat; and generate an input to trigger an action in software based on both the detected event and the detected movement.

The sensing mat may provide two different sensing modalities and the event and the movement may be detected by the sensing module using different sensing modalities.

Alternatively or in addition to any of the preceding examples the sensing mat may comprise: a capacitive sensing array; and an array of RF antennas.

Alternatively or in addition to any of the preceding examples the sensing module may be configured to detect the event using the array of RF antennas and to detect the movement using the capacitive sensing array.

Alternatively or in addition to any of the preceding examples the sensing module may be configured to detect the first object using the capacitive sensing array.

Alternatively or in addition to any of the preceding examples the sensing module may be configured to generate an input to trigger an action in software based on both the detected event and the detected movement by: determining whether the detected movement is correlated with the detected event; and in response to determining that the detected movement and the detected event are correlated, generating a first input; and in response to determining that the detected movement and the detected event are not correlated, generating a second input.

Alternatively or in addition to any of the preceding examples the detected movement may be a detected movement of a second object on the sensing mat.

Alternatively or in addition to any of the preceding examples the detected event may indicate ejection of a projectile from the first object, wherein the projectile is not detectable by the sensing surface device.

Alternatively or in addition to any of the preceding examples the sensing module may be configured to generate an input to trigger an action in software based on both the detected event and the detected movement by: selecting a set of candidate inputs based at least on the detected event; and selecting one of the set of candidate inputs based on the detected movement.

Alternatively or in addition to any of the preceding examples the detected movement may be a detected touch event or gesture.

A second further example provides a sensing surface device comprising: a sensing mat; and a sensing module coupled to the sensing mat and configured to: detect a first object at a first position on the sensing mat; detect an event associated with the first object; detect a movement of a second object on the sensing mat; and generate an input to trigger an action in software based on a determination of whether the movement of the second object correlates with the detected event.

A third further example provides a sensing surface device comprising: a sensing mat; and a sensing module coupled to the sensing mat and configured to: detect a first object at a first position on the sensing mat; detect an event associated with the first object; detect a gesture or touch-event at a second position on the sensing mat; and generate an input to trigger an action in software based on both the detected event and the detected gesture or touch-event.

A fourth further example provides a method comprising: detecting, using a sensing module coupled to a sensing mat, a position of a first object on the sensing mat; detecting, using the sensing module, an event associated with the first object; detecting, using the sensing module, a movement at a second position on the sensing mat; and generating an input to software based on a combination of the detected event and the detected movement.

Generating an input to software based on a combination of the detected event and the detected movement may comprise: determining whether the detected movement is correlated with the detected event; and generating an input based on a result of the correlation determination.

Determining whether the detected movement is correlated with the detected event may comprise: determining whether the movement occurred in a time window defined relative to a time of the detected event; and/or determining whether the movement occurred in a portion of the sensing mat defined relative to the position of the first object.

Alternatively or in addition to any of the preceding examples the detected movement may be movement of a second object on the sensing surface and determining whether the detected movement is correlated with the detected event may further comprise: determining, using the sensing module, whether a user was touching the second object at the time of the detected movement or immediately prior to the detected movement.

Detecting an event associated with the first object may comprise detecting a user interaction with the first object and detecting a movement at a second position comprises detecting a touch event or gesture at the second position.

Alternatively or in addition to any of the preceding examples the method may further comprise: detecting, using the sensing module, an orientation of the first object on the sensing mat.

Alternatively or in addition to any of the preceding examples the method may further comprise: detecting, using the sensing module, a movement at a third position on the sensing mat; and generating a further input to software based at least on a combination of the detected event and the detected movement at the third position.

Generating an input to software based on a combination of the detected event and the detected movement may comprise: selecting a candidate set of inputs based at least on the detected event; and selecting an input from the candidate set of inputs based at least on the detected movement.

Generating an input to software based on a combination of the detected event and the detected movement may comprise: selecting an incomplete input based at least on the detected event; determining one or more parameters based at least on the detected movement; and combining the incomplete input and the one or more parameters to generate the input to software.

Alternatively or in addition to any of the preceding examples the sensing mat may comprise a first sensing array and a second sensing array and wherein the event is detected using the first sensing array and the movement is detected using the second sensing array.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A sensing surface device comprising:
   a sensing mat; and
   a sensing module coupled to the sensing mat and configured to:
      detect a first object at a first position on the sensing mat;
      detect an event associated with the first object;
      detect a movement at a second position on the sensing mat; and
      generate an input to trigger an action in software based on both the detected event and the detected movement, the detected movement being a detected movement of a second object on the sensing mat and the detected event indicating ejection of a projectile from the first object that moves above the sensing mat.

2. The sensing surface device according to claim 1, wherein the sensing mat provides two different sensing modalities and the event and the movement are detected by the sensing module using different sensing modalities.

3. The sensing surface device according to claim 1, wherein the sensing mat comprises:
   a capacitive sensing array; and
   an array of RF antennas.

4. The sensing surface device according to claim 3, wherein the sensing module is configured to detect the event using the array of RF antennas and to detect the movement using the capacitive sensing array.

5. The sensing surface device according to claim 4, wherein the sensing module is configured to detect the first object using the capacitive sensing array.

6. The sensing surface device according to claim 1, wherein the sensing module is configured to generate an input to trigger an action in software based on both the detected event and the detected movement by:
   determining whether the detected movement is correlated with the detected event; and
   in response to determining that the detected movement and the detected event are correlated, generating a first input; and
   in response to determining that the detected movement and the detected event are not correlated, generating a second input.

7. The sensing surface device according to claim 6, wherein the projectile is not detectable by the sensing surface device.

8. The sensing surface device according to claim 1, wherein the sensing module is configured to generate an input to trigger an action in software based on both the detected event and the detected movement by:
   selecting a set of candidate inputs based at least on the detected event; and
   selecting one of the set of candidate inputs based on the detected movement.

9. The sensing surface device according to claim 8, wherein the detected movement is a detected touch event or gesture.

10. A method comprising:
    detecting, using a sensing module coupled to a sensing mat, a position of a first object on the sensing mat;
    detecting, using the sensing module, an event associated with the first object;
    detecting, using the sensing module, a movement at a second position on the sensing mat; and
    generating an input to software based on a combination of the detected event and the detected movement, the detected movement being a detected movement of a second object on the sensing mat and the detected event indicating ejection of a projectile from the first object that moves above the sensing mat.

11. The method according to claim 10, wherein generating an input to software based on a combination of the detected event and the detected movement comprises:
    determining whether the detected movement is correlated with the detected event; and
    generating an input based on a result of the correlation determination.

12. The method according to claim 11, wherein determining whether the detected movement is correlated with the detected event comprises:
    determining whether the movement occurred in a time window defined relative to a time of the detected event; and/or
    determining whether the movement occurred in a portion of the sensing mat defined relative to the position of the first object.

13. The method according to claim 12, wherein determining whether the detected movement is correlated with the detected event further comprises:
    determining, using the sensing module, whether a user was touching the second object at the time of the detected movement or immediately prior to the detected movement.

14. The method according to claim 10, wherein the detecting an event associated with the first object comprises detecting a user interaction with the first object and detecting a movement at a second position comprises detecting a touch event or gesture at the second position.

15. The method according to claim 10, further comprising:
    detecting, using the sensing module, an orientation of the first object on the sensing mat.

16. The method according to claim 10, further comprising:
    detecting, using the sensing module, a movement at a third position on the sensing mat; and
    generating a further input to software based at least on a combination of the detected event and the detected movement at the third position.

17. The method according to claim 10, wherein generating an input to software based on a combination of the detected event and the detected movement comprises:
    selecting a candidate set of inputs based at least on the detected event; and
    selecting an input from the candidate set of inputs based at least on the detected movement.

18. The method according to claim 10, wherein generating an input to software based on a combination of the detected event and the detected movement comprises:

selecting an incomplete input based at least on the detected event;

determining one or more parameters based at least on the detected movement; and combining the incomplete input and the one or more parameters to generate the input to software.

19. The method according to claim 10, wherein the sensing mat comprises a first sensing array and a second sensing array and wherein the event is detected using the first sensing array and the movement is detected using the second sensing array.

\* \* \* \* \*